POLYTONIC HIGH SPEED CALLING SIGNAL GENERATOR

Filed May 27, 1953 3 Sheets-Sheet 1

INVENTORS C. A. LOVELL
O. J. MURPHY
BY William F. Simpson
ATTORNEY

April 12, 1955 C. A. LOVELL ET AL 2,706,223

POLYTONIC HIGH SPEED CALLING SIGNAL GENERATOR

Filed May 27, 1953 3 Sheets-Sheet 2

INVENTORS C. A. LOVELL
O. J. MURPHY

BY William F. Simpson.

ATTORNEY

POLYTONIC HIGH SPEED CALLING SIGNAL GENERATOR

INVENTORS C. A. LOVELL
O. J. MURPHY

BY William F. Simpson.

ATTORNEY

United States Patent Office 2,706,223

Patented Apr. 12, 1955

2,706,223

POLYTONIC HIGH SPEED CALLING SIGNAL GENERATOR

Clarence A. Lovell, Summit, N. J., and Orlando J. Murphy, New York, N. Y., assignors to Bell Telephone Laboratories, Incorporated, New York, N. Y., a corporation of New York Application May 27, 1953, Serial No. 357,858

12 Claims. (Cl. 179—90)

This invention relates to calling systems and more particularly to improved methods, apparatus and equipment for multifrequency high speed signaling arrangements which may be readily employed in telephone and other signaling and calling systems.

More particularly, this invention relates to improved calling arrangements suitable for use in combination with receiving apparatus and equipment set forth in the co-pending application of C. A. Lovel, Serial No. 1,471, filed January 9, 1948.

Said application discloses multifrequency calling arrangements wherein voice frequency signals are employed to represent multisymbol or multidigit identification or subscribers' numbers. Each symbol, digit or numeral is transmitted from a calling station to a receiving station or device, which receiving device is usually located at a central switching point, by means of two different frequencies out of a total of five possibly different frequencies.

Similar types of signals are employed in the exemplary embodiment of this invention set forth in the present application which is directed to an improved subscriber's station equipment and method of operation thereof suitable for readily transmitting groups of such calling signals over a subscriber's line to a central control or switching point.

An object of the present invention is to provide an improved subscriber's station set and control equipment and methods of operation thereof to transmit signals to a receiving station more accurately, faster, with less expense and with a minimum of mechanically moving parts and with a minimum of electrical contacts.

Another object of this invention is to provide means in such an improved signaling system for controlling the equipment in such a manner that the called station identification or number may be set up on the equipment and the setting of the equipment visually checked prior to placing the call. Thereafter, the call is placed and the signals representing the called subscriber's station designation rapidly and repeatedly transmitted for so long an interval of time as may be desired or required to establish a connection to the called line or station.

An object of this invention relates to methods and means of energizing a resonant circuit by means of a step function derived from an alternating-current supply voltage.

Another object of this invention relates to a gas discharge tube in combination with a rectifier for shock-exciting one or more resonant circuits.

Still another object of this invention relates to circuit arrangements, equipment and methods of employing a gas tube in combination with a source of alternating current for simultaneously shock-exciting one or more resonant circuits at least once during each cycle of the alternating current.

Another object of this invention relates to apparatus, circuits and equipment for critically damping the oscillations in a resonant circuit.

The foregoing objects and features of this invention may be more readily understood from the following description when read with reference to the drawing in which:

Figs. 1 to 4, inclusive, show in detail the structural features of the call selecting switch which is manually settable by the calling subscriber in accordance with the symbols or numerals to be represented by the transmitted signals.

More particularly, Fig. 1 shows a front elevation of such a dial or settable device;

Figure 5:
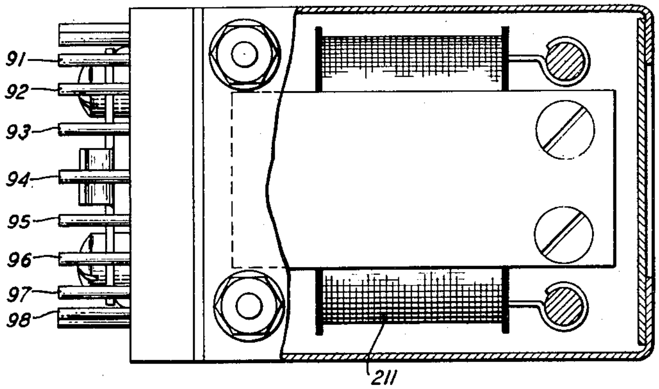
Figure 7:
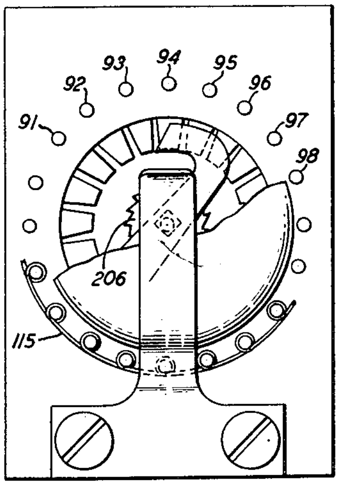
Figure 6:
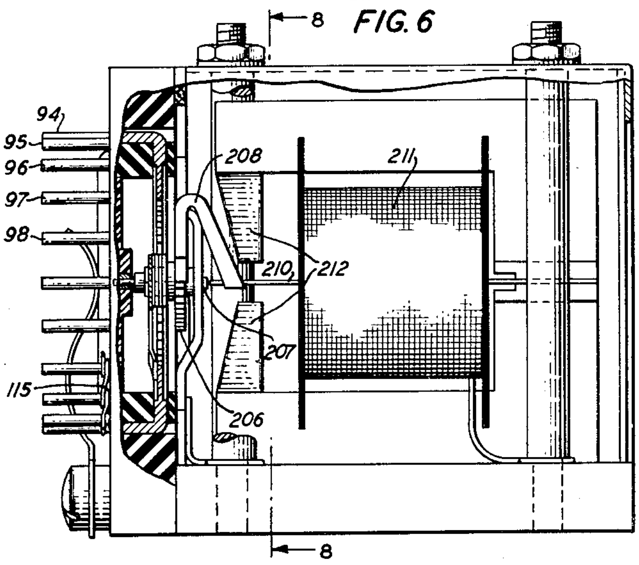
Figure 8:
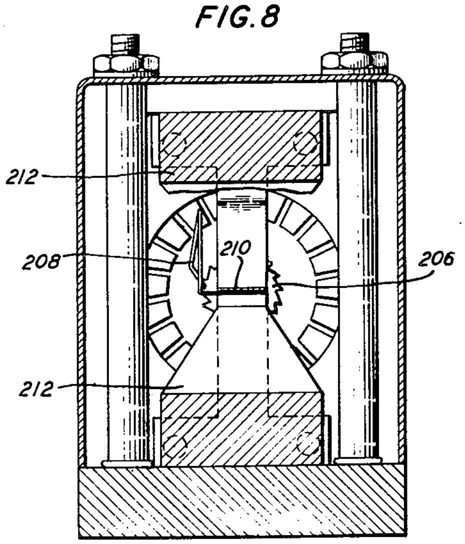
Figure 9:
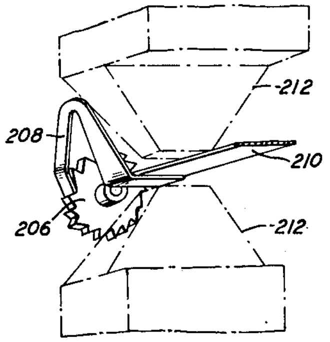
Figures 10, 11:
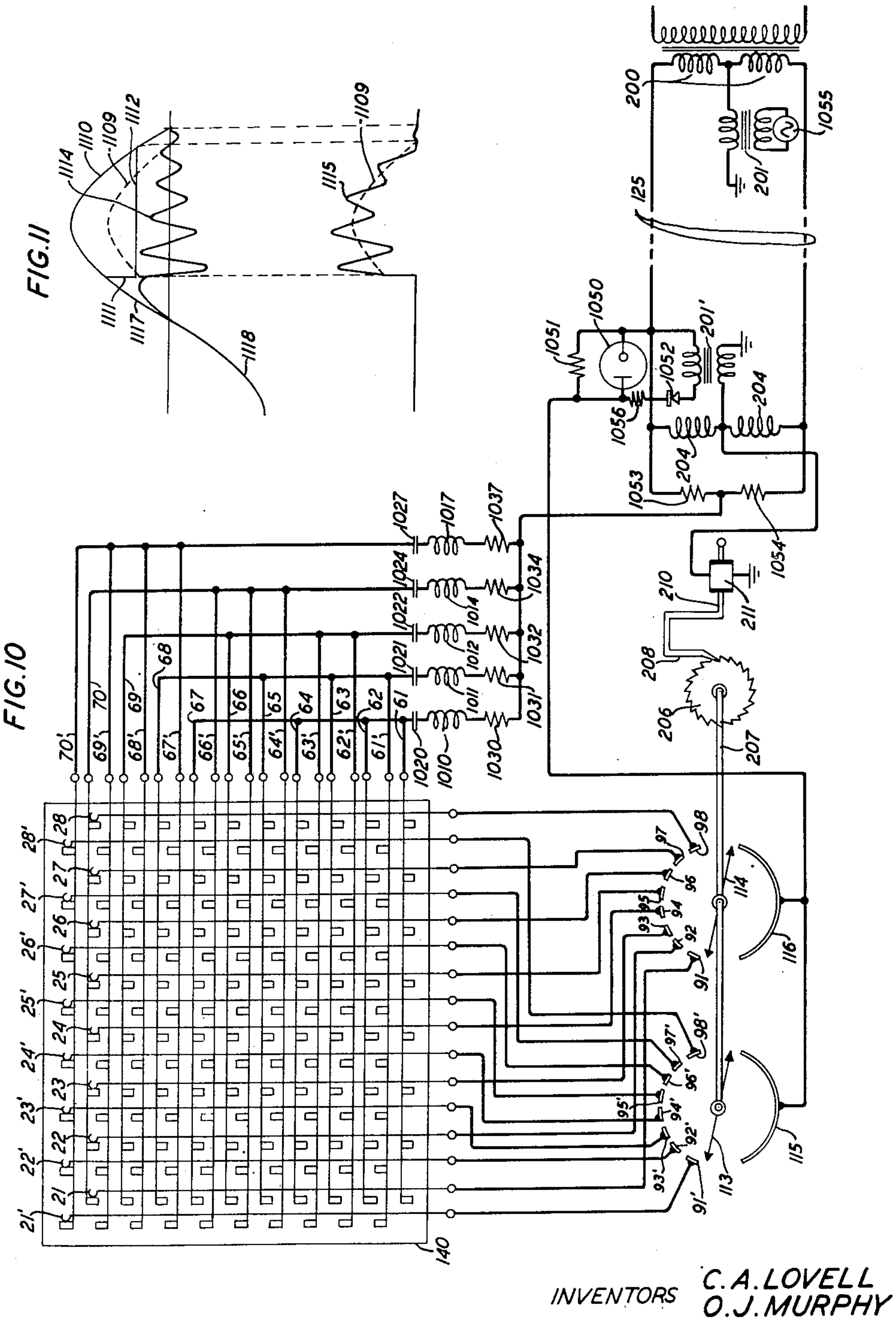

Figs. 5 through 9, inclusive, illustrate the structure of a stepping switch employed in combination with the dial or manual settable selector switch shown in Figs. 1 to 4 for selecting the various elements of said selectable device;

More particularly Fig. 5 is a top view, partly broken away, of the stepping mechanism;

Fig. 6 is a side view, partly broken away, of the stepping mechanism;

Fig. 7 is a front view, partially broken away, of the stepping mechanism;

Fig. 8 shows a section, partially broken away, taken along the section line 8—8 of Fig. 6;

Fig. 9 is a partial disclosure of the stepping mechanism showing the pole-pieces, the armature, the stepping pawl and ratchet wheel;

Fig. 10 shows the manner in which the dial or settable selecting device, stepping mechanism, the resonant circuits, the shock-exciting gas tube, and other related equipment are interconnected and cooperate one with another to form an improved exemplary signaling system in accordance with this invention; and Fig. 11 is a graph showing the manner in which the equipment performs in response to an applied alternating-current voltage wave form.

The signal transmitting equipment located at the subscriber's station in accordance with the present invention has been devised to transmit code combinations of different voice frequency signaling currents. It is to be understood, of course, that the invention does not require that voice frequency currents be employed. Instead, signaling currents of any desired frequencies may be employed, provided that they are high compared to the frequency of the alternating-current supply voltage used to actuate the device, when said alternating current is supplied over the subscriber's line.

In the exemplary embodiment of this invention set forth herein, signaling arrangements are employed which transmit a plurality of signals which satisfy the equations:

$$\int_0^{\tau} \theta_i(\lambda)\cdot\theta_j(\tau-\lambda)d\lambda=0,\ i\neq j \qquad (2a)$$

$$\int_0^{\tau} \theta_i(\lambda)\cdot\theta_j(\tau-\lambda)d\lambda=1,\ i=j \qquad (2b)$$

where $\theta_1(t)$, $\theta_2(t)$ . . . $\theta_n(t)$ represent a plurality of signaling functions which conform to or satisfy the above Equations 2*a* and 2*b*.

As pointed out in the above-identified copending application, the use of shock-excited oscillations which have a predetermined decrement, when applied to filter circuits having a similar dissipation constant or constants and which are tuned to the same frequencies, satisfy Equations (2*a*) and (2*b*) and in accordance with these equations produce one or the other of two different results. When the frequency of the applied shock-excitations is in the prescribed set of frequencies but is different from that for which the filter under consideration is designed, the output of the filter will be substantially zero at the end of a predetermined time interval $\tau$, while the output of the filter will be a finite value when the applied alternating-current wave has the same frequency as the frequency for which the filter is designed. This output exists at the end of the same time interval $\tau$, as set forth in the above-identified copending application.

Referring first to the system drawing shown in Fig. 10, 140 represents the manually settable devices or dials, the structure of which is shown in Figs. 1, 2, 3 and 4. The distributor or stepping device includes brush arms 113, 114 and related contacts 91 through 98; 91' through 98'; 115; and 116 as well as the driving magnet 211 and ratchet wheel 206, and driving pawl 208. The details of the mechanical structure of the distributor stepping device are shown in Figs. 5, 6, 7, 8 and 9.

In addition, the subscriber's or calling line is represented by conductors 125 which extend to a distant point, usually the central station where a source of alternating current 1055 is coupled to the line through transformer 201.

In accordance with applicant's present invention the necessity for the motor-driven distributor as well as the motor-driven contacts, filter circuit and related equipment of the prior art has been eliminated.

A group of five resonant circuits is shown in the center of Fig. 10. Each resonant circuit comprises a condenser, an inductance and a resistor. These elements are designated 1020, 1010 and 1030 respectively for the first resonant circuit. For the second resonant circuit these elements are designated 1021, 1011 and 1031. For the third resonant circuit these elements are designated 1022, 1012 and 1032. In the fourth resonant circuit these elements are designated 1024, 1014 and 1034, while in the fifth resonant circuit these elements are designated 1027, 1017 and 1037.

As shown in Fig. 10, the alternating current is applied to both subscribers' or calling line conductors and to ground by means of transformer 201. In other words, the center point of the coils or the transformer 200 is connected to the right-hand terminal of the secondary winding of transformer 201. In a similar manner, at the subscriber's or calling station a second transformer 201' is provided and connected between the center point of winding or simplex coils 204 and ground. The secondary of this transformer is connected to one side of the subscriber's line and also to one terminal of the gas discharge tube 1050 and one terminal of resistor 1051.

The other terminal of the secondary of transformer 201' is connected through a rectifier or diode 1052 to the other terminal of tube 1050 and resistor 1051.

The rectifier or diode 1052 may be either a crystal rectifier such as silicon, germanium, or a selenium rectifier or it may be a high vacuum rectifier or diode, or any other suitable type of rectifier which permits current to flow through it readily in one direction but not in the other.

From the left-hand terminal of the rectifier or diode 1052 a circuit extends through the stepping device including the brush arms 113 and 114, the manually settable device or dials 140 and then selectively to the resonant circuits described above. The other side of all the resonant circuits is a common point electrically and extends to resistors 1053 and 1054 and then to the respective line conductors extending to the distant receiving station.

Figures 1, 2:
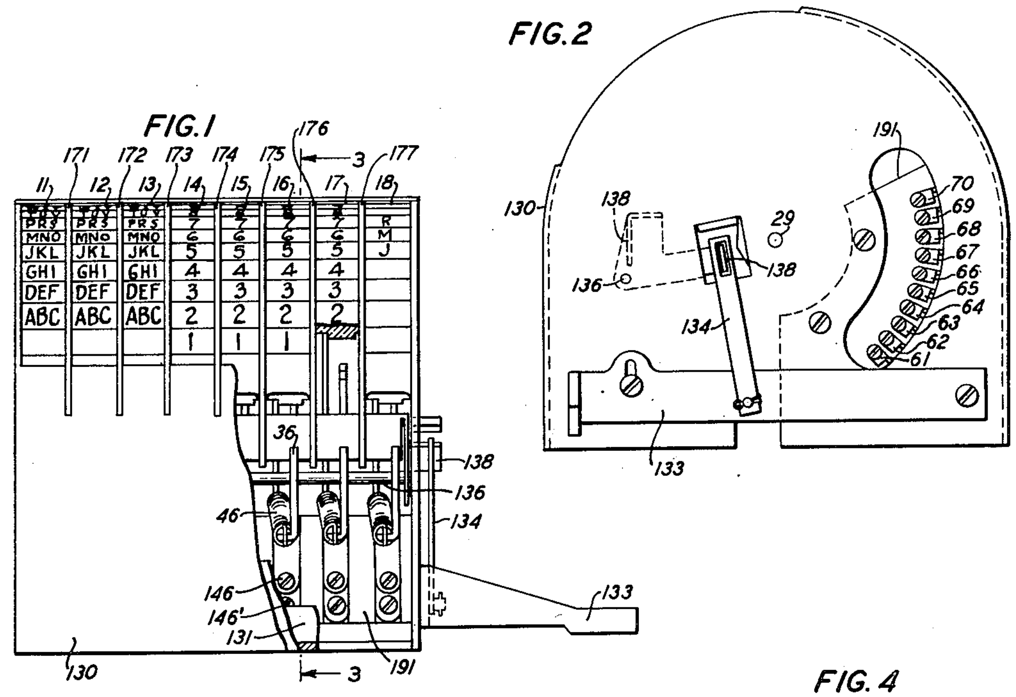
Fig. 2 shows an end views of the same device.
Figure 3:
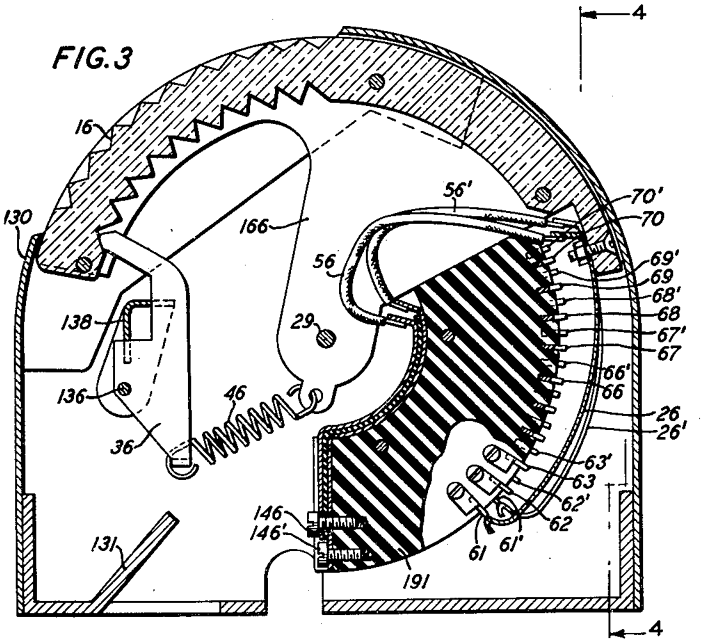
Fig. 3 shows a partially sectional view along lines 3—3 of Fig. 1.

Figs. 1, 2, 3 and 4 show one embodiment of the selector switch 140, which is enclosed in case 130, with selector dials 11 to 18 and release lever 133 accessible to an operator. The selector dials are made of a nonconducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves or notches which correspond to the finger indentations on the outer periphery of the dial. The grooves on each dial serve to engage with a detent pawl, to secure each dial in one of the ten possible positions as selected by the operator. As indicated in Fig. 3, detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves or notches on the dials and the detent pawls are shaped and positioned so that by pressing upon the finger indentations in a dial an operator can move the dial in either direction and so that the ratchet action of the pawl against the notches secures the dial in any one of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits tach detent pawl to engage with a groove in the corresponding dial. When lever 133 is depressed, arm 138 is moved in a clockwise direction as viewed in Fig. 2 about shaft 136 and the detent pawls are disengaged from the dials, thereby permitting the spring associated with each dial to cause each dial to return to its initial position.

Figure 4:
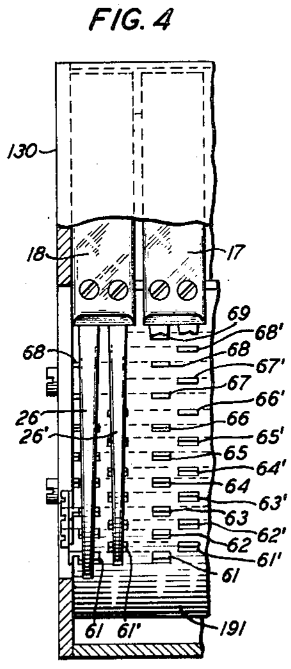
Fig. 4 shows a partially sectional view of Fig. 3 taken along lines 4—4.

In order to provide for simultaneously selecting two of the five resonant circuits two contact members are provided for each of the selector or dial members 11 through 18. These members are illustrated in Figs. 3 and 4 by springs 26 and 26' and are connected by means of flexible leads or wires 56 and 56' to the corresponding terminals or screws 146 and 146'. Each of the springs 26 are arranged to make contact with one of the bus bars 61 through 70, inclusive, and each spring 26' is arranged to make contact with bus bars 61' through 70'. Thus in any position of the associated finger wheel or dial such as 16 of Fig. 3, brush or contact member 26 will make contact with one of the bus bars 61 through 70 and brush or contact member 26' will make contact with the corresponding bus bars 61' through 70'. The insulating member 191 extends along the rear of the selector mechanism and supports two sets of two bus bars 61 through 70 and 61' through 70' as indicated in the drawings. In this way connections are made between the selected resonant circuits and contacts or segments of the distributor mechanism shown in Figs. 5, 6, 7, 8 and 9 and illustrated in Fig. 10 by the contact segments 91 to 98, inclusive, and 91' through 98', inclusive, magnet 211, etc.

Figs. 5, 6, 7, 8 and 9 indicate one embodiment of the stepping device and distributor. The distributor comprises two brushes 113 and 114 moving over two sets of contacts 91 to 98 and 91' to 98'. The brushes are driven by ratchet wheel 206 through shaft 207. The ratchet wheel is driven by stepping pawl 208 which is attached to magnetic reed 210. The magnetic structure is polarized by permanent magnets 212 and magnetic reed 210 is actuated by coil 211. When an alternating current is applied to coil 211, the magnetic polarity of reed 210 is changed each half cycle of the alternating current so that the reed moves both upward and downward during each cycle of the alternating current. Each time reed 210 moves downward ratchet wheel 206 is moved one step by the stepping pawl 208. Thus, ratchet wheel 206 and brushes 113 and 114 are moved one step during each cycle of the alternating current. As described herein the winding is connected in such a direction as to advance the brushes one step during the negative half cycles of the applied alternating-current power.

In the embodiment of this invention shown in Fig. 10 the alternating current for operating and energizing the stepping device is supplied from the mid-point of the windings 204 of the simplex coil. The stepping device is tuned and may in addition, when desired, include circuits and apparatus to properly phase the stepping of the device so that it steps during portions of the alternating-current cycle during which no pulses are generated, i. e., during the negative portions of the applied alternating-current power.

In operating the calling device in accordance with this invention the subscriber will first position the dials or finger wheels 11 through 18, inclusive, in accordance with the digits, characters or symbols of the called subscriber's station designation or number. This designation or number should then appear just above the edge of the case 130 of the calling device. The subscriber can then check the accuracy of the setting of the device and if the subscriber has made any errors, the subscriber may either set the individual finger wheels to correct the error or the subscriber may actuate the resetting lever 133 and then start over again. In any event, when the subscriber has accurately positioned the finger wheels and has had an opportunity to check the accuracy of the setting of this device, the subscriber may then place the call.

The actuation of the selecting devices or finger wheels 11 through 18 causes the spring members 21 to 28 and 21' to 28' to connect and make contact with the bus bars 61 through 70 and 61′ through 70′. In this manner the pairs of resonant circuits including condensers 1020, 1021, 1022, 1024 and 1027 are selectively connected to contacts of the distributor mechanism with which the brush arms 113 and 114 cooperate. Upon the initiation of a call the equipment at the subscriber's station will be conditioned and connected as shown in Fig. 10 of the drawing. Likewise, the equipment at the central station will be actuated to apply a source of alternating current such as 1055 to the subscriber's line in the manner described above for actuating the signaling equipment as described herein. In addition a call signal receiver will be connected to the subscriber's line in any suitable manner such as through the coupling coils of a coupling transformer 200.

Suitable switching equipment at the subscriber's station is disclosed in Patent 2,598,695, issued June 3, 1952 to Hill and Parkinson, and in patent application of Dunlap-Malthaner Serial No. 116,068, filed September 16, 1949. Typical switching equipment at the central station may be employed in cooperation with other circuits of applicant's invention. Suitable switching equipment is disclosed in a patent application of Malthaner-Vaughan Serial No. 115,961, filed September 16, 1949. Of course, the receiver employed in such a system must be designed to cooperate with the multifrequency signals generated by the subscriber's station equipment such as disclosed in the above-identified copending application of C. A. Lovell. Inasmuch as the circuits and equipment disclosed in the above-identified patent applications operate in the usual manner as described in said applications when used in combination with the invention described herein, descriptions of these systems and apparatus have not been repeated herein.

Upon the application of alternating-current power from source 1055, which in an exemplary embodiment may be of the order of 45 cycles per second, to the subscriber's line at the center station, the equipment at the subscriber's station in the exemplary embodiment shown in Fig. 10 is set into operation.

First to be considered is the stepping magnet having winding 211 which is energized whereupon the armature 210 vibrates and causes the pawl 208 to advance the ratchet wheel 206 one step during each cycle of the applied alternating current. The armature 210 is polarized so that it will advance the ratchet wheel 206 one step during each negative half cycle of the applied alternating current. The applied alternating-current wave form is represented by curve 1117, 1110 and 1118 in Fig. 11. The stepping device is tuned so that it vibrates with the proper phase relationship to the applied alternating current to cause the ratchet wheel 206 to advance one step during the negative half cycles of the applied alternating-current power wave form. A portion of one such negative half cycle is designated 1118 in Fig. 11.

Assume for purposes of illustration that the brush arms 113 and 114 are resting in the position shown in the drawing. Also assume that when the alternating current is first applied to the system it will be applied at a time near the beginning of a negative half cycle. The alternating current, of course, may have any phase when it is first applied to the system. Likewise, the brush arms 113 and 114 may be resting in any position when the alternating current is first applied to the system. However, the mode of operation is substantially the same and is more easily understood if it is assumed that the alternating current is applied to the system at a time near the beginning of a negative half cycle so that magnet 211 and armature 210 respond to this negative half cycle and cause brush arms 113 and 114 to engage the repective contacts 91′ and 91.

Further assume that the first dial or finger wheel 11 is set in position 0 so that spring 21′ engages the bus bar 70′ and spring 21 engages bus bar 70. Consequently, the resonant circuits including condensers 1024 and 1027 are connected in the signaling circuit at this time.

During the negative portion 1118 of the applied alternating-current voltage the rectifier or diode 1052 working against the resistive load 1051 prevents the application of any appreciable voltage to the condensers 1024 and 1027 of the respective resonant circuits. However, at the beginning of the positive half cycle as represented at 1117 the rectifier 1052 becomes conducting and assumes a low impedance value. The applied voltage, in series with resistor 1056 and the diode 1052 then causes the voltage across the condensers 1024 and 1027 of the respective resonant circuits as well as the voltages across tube 1050 and the resistor 1051 to rise in the manner illustrated by the portion of the curve or graph of the applied alternating-current voltage represented at 1117. The resistor 1056 is chosen to equal or slightly exceed the value of critical damping resistance for the tuned circuits. Under this condition the rise of voltage represented by the portion of the curve 1117 cannot give rise to any oscillations in the tuned circuits. In addition, the rise is sufficiently slow and starts sufficiently near zero due to the wave form of the applied alternating current voltage and the operation of the diode 1052 that, in the usual case, the unidirectional current which flows to charge the condensers of the tuned circuits is relatively low.

When the voltage applied across the condensers 1024 and 1027, and also across the tube 1050 and resistor 1051 reaches the breakdown voltage of the tube 1050, a discharge will be initiated through this tube. The voltage drop across the tube then abruptly falls to a lower sustaining voltage in accordance with the usual mode of operation of gas discharge tubes. The abrupt change in voltage across tube 1050 is represented by a line 1111 of Fig. 11 and the sustaining voltage by the horizontal line 1112 shown in Fig. 11. As shown by the horizontal line 1112 the voltage drop across the tube 1050 thereafter remains substantially constant throughout the remainder of the discharge period of tube 1050 and thus throughout most of the remainder of the positive half cycle of the applied alternating-current voltage. During the discharge, the alternating-current impedance of the gas tube 1050 is quite low. During this discharge time, while the voltage across the tube remains substantially constant, as shown by line 1112, the current through the tube tends to follow the applied alternating-current wave form as illustrated by graph 1109 o Fig. 11.

The abrupt change in voltage across tube 1050 comprises in effect a "step" wave form or function which shock-excites the ıesonant circuits and because of the low impedance of the gas tube 1050 at this time, a path is provided for the flow of the damped alternating currents of the resonant frequencies through the respective resonant circuits. The circuit paths for the flow of these alternating currents extend from the contacts 115 and 116 of the stepping switch and then through the brush arms 113 and 114 and the corresponding contacts of the stepping switch and then through contacts of the manual selector switch 140 to the selected resonant circuits, then through these resonant circuits and resistor 1053, and gas tube 1050, back to the contacts 115 and 116 of the stepping switch. The oscillator alternating current flowing in these circuits due to the shock-excitation of the resonant circuits is in the form of a damped alternating current, which current is illustrated by the graph 1114 of Fig. 11.

A current flowing through the gas discharge tube 1050 is therefore the sum of the current of the applied alternating-current power and the current from the resonant circuits, which combined and total current has a wave form shown by graph 1115 of Fig. 11. As shown by this graph, the combined current through tube 1050 never becomes negative so that tube 1050 is not extinguished at this time. While the resonant damped alternating-current wave form shown by graph 1114 has negative half cycles, when these are added to the current from the power source flowing through tube 1050, the combined current at all times remains sufficiently positive to maintain conduction within tube 1050, as is illustrated by the graph 1115. Graph 1114 shows only a single frequency for simplicity. However, a frequency will be present for each of the resonant circuits which is shock-excited. As pointed out hereinbefore, two such circuits are shock-excited to represent each numeral or digit of the subscriber's number or station designation.

The frequency of the alternating-current voltages induced in the resonant circuits at this time is controlled by the magnitude of condensers 1024 and 1027 and the magnitude of the inductors 1014 and 1017. The decrement of this alternating-current voltage wave form is controlled by resistors 1034 and 1037, respectively, and the resistance inherently associated with the coils 1014 and 1017 as well as by the magnitude of the resistor 1053 and to a lesser extent by the magnitude of resistor 1054 and the impedance of line 125 extending to the central switching station.

The path for the flow of these alternating currents induced in the respective resonant circuits extends, for example, from the upper terminal of condenser 1024 through bus bar 70, brush 21, terminal 91, brush arm 114, terminal 116, the low impedance of a conducting discharge tube 1050 in parallel with resistor 1051, resistor 1053, back through the resistor 1034 and inductor 1014 of the resonant circuit. A similar path may be traced for the resonant coils flowing in the resonant circuit of condenser 1027.

Resistor 1053 is included to provide a low impedance path for the flow of the alternating resonant currents of the various resonant circuits, while permitting the decrement of the circuits to be individually adjusted by their individual resistors. The voltage drop due to these alternating currents flowing through the resistor 1053 is applied to the subscriber's line 125 extending to the receiving station through the resistor 1054. The resistor 1054 has a higher resistance than resistor 1053 and is provided as a decoupling resistor so that variations in line impedance do not materially affect either the frequency or the damping constant of the resonant circuits of the currents caused to flow therein due to the shock-exciting of these circuits by the step function generated by gas tube 1050 as described above.

Near the end of the first positive half cycle the applied voltage will fall below the sustaining voltage of tube 1050, thus extinguishing this tube and forcing the oscillatory currents to traverse the damping resistor 1056. This quickly damps them out. The ratchet 206 will be advanced another step during the ensuing negative half cycle and advance brush arms 113 and 114 to terminals 92′ and 92, whereupon the above cycle of operations is again repeated. This time the brushes 22 and 22′ instead of 21 and 21′ are connected in series with two of the resonant circuits. In this case the two resonant circuits selected depend upon the position of the second finger wheel 12 and the corresponding position of the brushes 22 and 22′. In a similar manner, damped pulses of alternating current are transmitted representing each of the digits of the subscriber's designation or number. When brush arm 113 passes off the terminal 98′ and brush arm 114 substantially simultaneously passes off contact 98, no pulses are transmitted for substantially two pulse intervals which pause, or blank interval, is employed to synchronize and control the receiving circuits at a distant station or central office in the manner described in the above-identified copending application. The above cycles of operation are then repeated so long as the alternating current is applied to the subscriber's line. As a result, the exemplary embodiment of a calling arrangement in accordance with this invention repeatedly transmits pairs of alternating-current pulses having different frequencies representing the various symbols and numerals of the called station's number or designation, so long as alternating current is applied to the subscriber's station over subscribers' lines and so long as the subscriber desires to make such a call. The voltage is removed at the central office when the desired connections are made, thus stopping the generation of signals and leaving the line available for speech or other signals.

Upon the termination of the call the subscriber restores the equipment to normal except the dials or finger wheels of selecting devices 140 may be maintained in their previously set positions. In case the called line is busy and the subscriber wishes to make another call to this same line at a short interval of time later, he may do so with the minimum of effort. Of course, the dials, or finger wheels, may all be restored to normal, if desired, by operation of the reset lever 133.

It is to be understood that the above-described arrangements are illustrative of the application of the principles of the invention and that numerous other arrangements may be devised by those skilled in the art without departing from the spirit and scope of this invention.

What is claimed is:

1. In a calling arrangement in combination, a calling line, a calling station connected thereto including a plurality of resonant circuits for generating calling damped alternating currents of predetermined frequencies and decrement, a plurality of manually selectable devices each constructed to be selectably interconnected with pairs of said resonant circuits, a distributor mechanism for successively connecting said manually selectable devices to said line, means for connecting said resonant circuits with said line, and apparatus included in said connecting means for applying alternating-current power to said resonant circuits and said line including a gas discharge tube for abruptly changing the voltage applied to said resonant circuits each time a discharge is initiated therethrough for shock-exciting oscillations of predetermined frequency and decrement in pairs of said resonant circuits.

2. In a calling arrangement comprising in combination a calling line, a calling station connected thereto, a plurality of resonant circuits for generating calling damped alternating currents of predetermined frequency and decrement, a distributor mechanism, means responsive to alternating-current power for driving said distributor mechanism, a plurality of manually selectable devices each for selectably interconnecting pairs of said resonant circuits to different positions of said distributor mechanism, apparatus for shock-exciting said resonant circuits comprising in combination a gas discharge tube which conducts substantially no current until a predetermined voltage is applied across it whereupon the voltage across said tube abruptly falls to a lower sustaining voltage, and means for applying an alternating-current power to said resonant circuits and to said gas discharge tube and to said means for driving said distributor mechanism.

3. In a telephone calling arrangement, a calling line, calling apparatus comprising in combination a plurality of resonant circuits for generating calling alternating currents of predetermined frequency and decrement, a stepping distributor mechanism, apparatus for applying alternating-current power to said stepping distributor to advance said distributor one step in response to each cycle of alternating-current power applied thereto, a plurality of manually settable devices for selectively connecting pairs of said resonant circuits to different steps of said distributor mechanism, a gas discharge tube interconnected in series with said selected resonant circuits and apparatus for applying a voltage derived from alternating-current power to said circuits including said resonant circuits and said gas tube, and apparatus for transmitting shock-excited calling alternating currents from said resonant circuits over said line.

4. In a calling arrangement in combination, a series circuit including a resonant circuit for generating a calling alternating current of a predetermined frequency and decrement, a gas discharge tube connected to said circuit, means for applying alternating-current power to said series circuit having a maximum instantaneous voltage in excess of the breakdown voltage of said tube for shock-exciting said resonant circuit in response to the abrupt change in voltage produced in said circuit by a discharge through said tube, apparatus for transmitting a voltage derived from said shock-excited calling alternating current over said line.

5. In a telephone calling arrangement, a calling line, calling apparatus comprising in combination a plurality of resonant circuits for generating calling alternating currents of predetermined frequency and decrement, a stepping distributor, apparatus for applying alternating current power to said stepping distributor to advvance said distributor one step in response to each half cycle of said alternating-current power of a predetermined polarity, a plurality of manually selectable devices for selectively connecting pairs of said resonant circuits to different contacts of said distributor mechanism, a gaseous conduction tube interconnected with said selected resonant circuits and apparatus for applying the half cycles of said alternating-current power of polarity opposite to the polarity causing said distributor mechanism to step to said circuits including said selected resonant circuits and said gas tube, and apparatus for transmitting resulting shock-excited alternating calling currents from said resonant circuits over said line.

6. In a telephone calling arrangement, a calling line, calling apparatus comprising in combination a plurality of resonant circuits for generating calling alternating currents of predetermined frequency and decrement, a stepping distributor, apparatus for applying alternating-current power to said stepping distributor to advance said distributor one step in response to each half cycle of said alternating-current power of a predetermined polarity, a plurality of manually selectable devices for selectively connecting pairs of said resonant circuits to different contacts of said distributor mechanism, a gaseous conduction tube interconnected with said selected resonant circuits and apparatus for applying the half cycles of said alternating-current power of polarity opposite to the polarity causing said distributor mechanism to step to said circuits including said selected resonant circuits and said gas tube, and a coupling network interconnecting said circuit including said resonant circuits and said line to reduce the effect of variations of the constants of said line upon said resonant circuits.

7. In a calling arrangement in combination, a series resonant circuit for generating a calling alternating current of a predetermined frequency and decrement, a gas discharge tube connected to said circuits, means for applying an alternating-current power to said series circuit having a maximum instantaneous voltage in excess of the breakdown voltage of said tube for shock-exciting said resonant current in response to the abrupt change in voltage produced in said circuit by a discharge through said tube, a calling line and a coupling network interposed between said resonant circuit and said calling line for reducing the effect of variations of the electrical constants of said line upon the frequency and decrement of said resonant circuits.

8. In a telephone calling arrangement in combination, a calling line, calling apparatus comprising in combination an electrically resonant circuit for generating a calling alternating current of predetermined frequency and decrement, an inductance and condenser connected in said resonance circuit, an electrical step wave generator connected to said resonant circuit for shock-exciting said resonant circuit in response to a step wave, a resistive element connected in said resonant circuit and apparatus connected to said resistive element for applying a voltage to said signaling line under control of the voltage drop across said resistive element.

9. In a telephone calling arrangement, a calling line, calling apparatus electrically connectable thereto comprising in combination a plurality of resonant circuits for generating calling alternating currents of predetermined frequency and decrement, a gas discharge tube connected to said resonant circuits, means for applying alternating-current power to said gas discharge tube, which alternating-current power has a maximum instantaneous voltage in excess of the breakdown voltage of said tube for shock-exciting said resonant circuits in response to the abrupt change in voltage produced in said circuits by a discharge through said tube, a resistive element connected in said resonant circuits and apparatus for transmitting a voltage derived from said resistive element over said calling line.

10. In a telephone calling arrangement in combination, a calling line, calling apparatus comprising in combination a stepping distributor mechanism, means for applying an alternating-current power to said stepping distributor to advance said distributor one step in response to each cycle of alternating-current power applied thereto, a plurality of resonant circuits for generating calling alternating currents of predetermined frequency and decrement, a plurality of manually selectable devices for selectively connecting pairs of said resonant circuits to different steps of said distributor mechanism, a gas discharge tube interconnected with said resonant circuits, circuit means for applying alternating-current power to said resonant circuits and to said gas discharge tube, a resistive element included in the path of said calling resonant oscillatory currents, and interconnecting circuit means for transmitting a voltage derived from said shock-excited calling alternating current over said line.

11. In a telephone calling arrangement, a calling line, calling means comprising in combination an electrically resonant circuit for generating a calling alternating current of a predetermined frequency, an electrical step wave generator including a gas discharge tube electrically interconnected with said resonant circuit for shock-exciting said resonant circuit in response to step waves from said generator, means for applying an alternating-current power to said gas discharge tube which alternating-current power has a maximum instantaneous voltage in excess of the breakdown voltage of said tube whereby discharges are initiated through said tube generating step waves which shock-excite said resonant circuit, and resistive means connected in said resonant circuit operative after termination of discharges through said tube to dissipate the electrical energy in said resonant circuit at that time.

12. In a telephone calling arrangement, a calling line, calling apparatus electrically connectable thereto comprising in combination a plurality of resonant circuits for generating calling alternating currents of predetermined frequency and decrement, a gas discharge tube connected to said resonant circuits, means for applying an alternating-current power to said gas discharge tube, which alternating-current power has a maximum instantaneous voltage in excess of the breakdown voltage of said tube for shock-exciting said resonant circuits in response to the abrupt change in voltage produced in said circuits by a discharge through said tube, a resistive element connected in said resonant circuits, apparatus for transmitting a voltage derived from said resistive element over said calling line, and resistive means connected in said resonant circuit operative after termination of discharges through said tube to dissipate the electrical energy in said resonant circuit at that time.

References Cited in the file of this patent

UNITED STATES PATENTS

| | | |
|---|---|---|
| 2,228,113 | Hersey | Jan. 7, 1941 |
| 2,594,300 | Dunlop et al. | Apr. 29, 1952 |